United States Patent [19]

Suzuki et al.

[11] Patent Number: 4,995,710

[45] Date of Patent: Feb. 26, 1991

[54] OBJECTIVE LENS FOR OPTICAL DISK

[75] Inventors: Seizoh Suzuki, Tokyo; Osamu Endou, Kawasaki, both of Japan

[73] Assignee: Ricoh Company, Ltd., Tokyo, Japan

[21] Appl. No.: 528,491

[22] Filed: May 25, 1990

[30] Foreign Application Priority Data

May 31, 1989 [JP] Japan .................................. 1-137806

[51] Int. Cl.[5] ......................... G02B 9/06; G02B 21/02

[52] U.S. Cl. ..................................... 350/480; 350/414

[58] Field of Search ........................ 350/479, 480, 414

[56] References Cited

U.S. PATENT DOCUMENTS

| | | | |
|---|---|---|---|
| 4,270,843 | 6/1981 | Goto | 350/480 |
| 4,484,803 | 11/1984 | Arai | 350/480 |
| 4,588,264 | 5/1986 | Shimizu | 350/414 |
| 4,666,256 | 5/1987 | Shimizu et al. | 350/414 |

FOREIGN PATENT DOCUMENTS

| | | |
|---|---|---|
| 58-72114 | 4/1983 | Japan . |
| 60-232519 | 11/1985 | Japan . |
| 62-35310 | 2/1987 | Japan . |
| 62-286009 | 12/1987 | Japan . |

*Primary Examiner*—Scott J. Sugarman

*Attorney, Agent, or Firm*—Oblon, Spivak, McClelland, Maier & Neustadt

[57] ABSTRACT

An objective lens for an optical disk has a first lens group constructed by joining a negative meniscus lens, a biconvex lens, and a negative meniscus lens sequentially arranged from the side of a light source; and a second lens group constructed by a positive meniscus lens. The first and second lens groups are sequentially arranged from the side of the light source toward the side of the optical disk. A combined focal distance f of the entire lens system, a focal distance $f_1$ of the first lens group, a radius $r_i$ ($i=1$ to 6) of curvature of an i-th lens face from the side of the light source, and a refractive index $n_j$ and an Abbe number $\nu_j$ ($j=1$ to 4) of a j-th lens from the side of the light source satisfy the following conditions, (I) $0.7 \geqq f^2/|r_2 \cdot r_3| < 2.0, r_2 > 0, r_3 < 0$ (II) $2.0 < [(n_1-1)+(n_3-1)]/(n_2-1) < 3.0$ (III) $15 < [(\nu_2-\nu_1)+(\nu_2-\nu_3)] < 90$ and (IV) $2.0 < (f_1/f) < 6.0$

5 Claims, 4 Drawing Sheets

SPHERICAL ABERRATION

ASTIGMATISM

DISTORTION ABERRATION

SPHERICAL ABERRATION

ASTIGMATISM

DISTORTION ABERRATION

OBJECTIVE LENS FOR OPTICAL DISK

BACKGROUND OF THE INVENTION

1. Field of the Invention

The present invention relates to an objective lens used in an optical pickup for an optical disk.

2. Description of the Related Art

In general, coherent monochromatic light such as a laser beam is used to record, reproduce and erase information of high density with respect to an optical disk.

Accordingly, a normal objective lens for the optical disk is corrected with respect to aberration about a single wavelength, but is not sufficiently considered with respect to chromatic aberration.

A semiconductor laser has been recently used as a light source of an optical pickup. However, in the semiconductor laser, a wavelength of light is rapidly changed by a so-called mode hopping. When such a change in wavelength is caused, defocus is caused when no chromatic aberration is sufficiently considered with respect to the objective lens.

The change in wavelength by the mode hopping is caused by a change in atmospheric temperature and is also caused when a recording or erasing mode and a reproducing mode are switched.

In the optical pickup, focusing control is performed by a voice coil actuator, etc. When the change in wavelength by the mode hopping is caused, a focusing control speed cannot follow the defocusing operation caused by the change in wavelength so that it is difficult to record and reproduce data at a high speed.

Further, it is necessary to secure a sufficient working distance to prevent the objective lens from coming in contact with the optical disk when no focusing control is completed and an error in focusing operation is caused.

SUMMARY OF THE INVENTION

It is therefore an object of the present invention to provide a novel objective lens for an optical disk for sufficiently correcting chromatic aberration and securing a sufficiently long working distance so as to preferably record, erase and reproduce information even when a laser oscillating wavelength is rapidly changed.

The above object of the present invention can be achieved by an objective lens for an optical disk comprising a first lens group constructed by joining a negative meniscus lens, a biconvex lens, and a negative meniscus lens sequentially arranged from the side of a light source; and a second lens group constructed by a positive meniscus lens; the first and second lens groups being sequentially arranged from the side of the light source toward the side of the optical disk; a combined focal distance f of the entire lens system, a focal distance $f_1$ of the first lens group, a radius $r_i$ ($i=1$ to 6) of curvature of an i-th lens face from the side of the light source, and a refractive index $n_j$ and an Abbe number $\nu_j$ ($j=1$ to 4) of a j-th lens from the side of the light source satisfying the following conditions.

(I) $0.7<f^2/|r_2 \cdot r_3|<2.0$, $r_2>0$, $r_3<0$ (II) $2.0<[(n_1-1)+(n_3-1)]/(n_2-1)<3.0$ (III) $15<[(\nu_2-\nu_1)+(\nu_2-\nu_3)]<90$ and (IV) $2.0<(f_1/f)<6.0$.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an objective lens for an optical disk in the present invention will next be described in detail with reference to the accompanying drawings.

Figure 1:
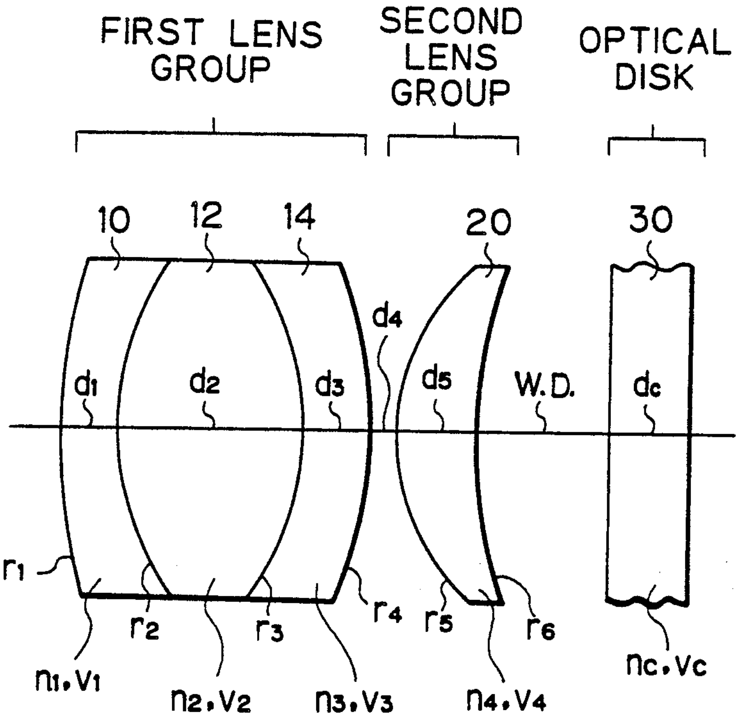
FIG. 1 is a view for explaining the construction of an objective lens for an optical disk in the present invention.
Figure 2A:
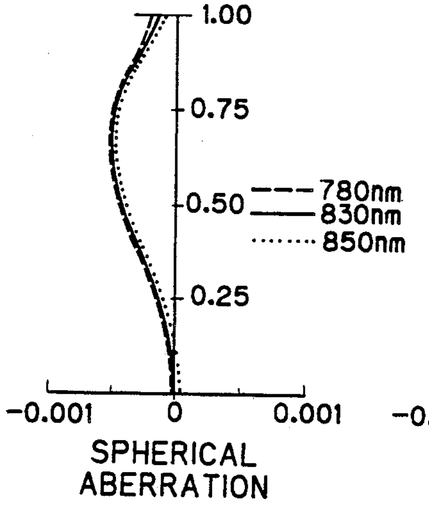
FIGS. 2 to 7 are aberration diagrams of the objective lens with respect to respective Embodiments 1 to 6.
Figure 2B:
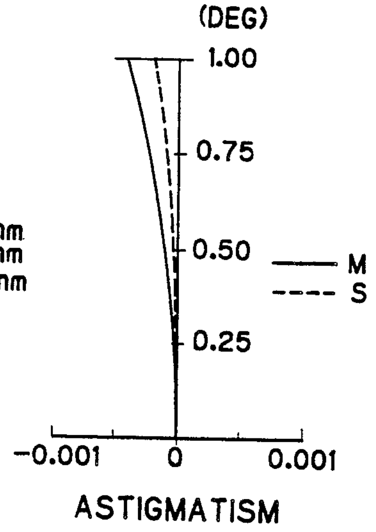
Figure 2C:
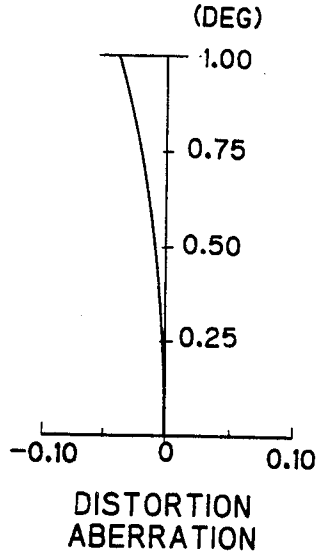
Figure 3A:
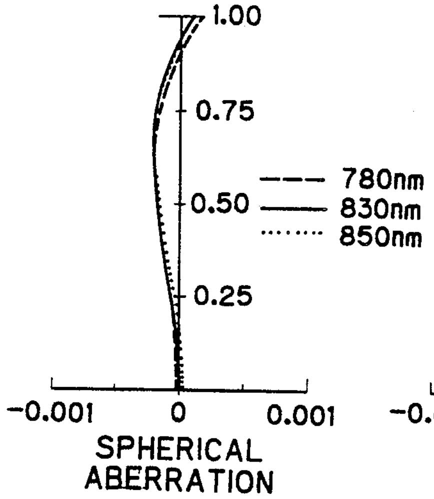
Figure 3B:
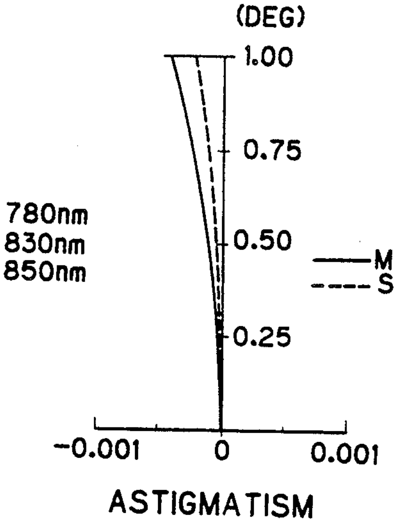
Figure 3C:
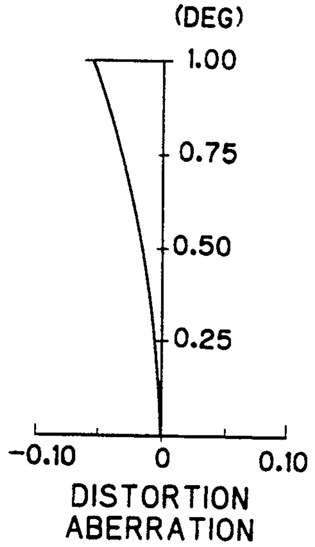
Figure 4A:
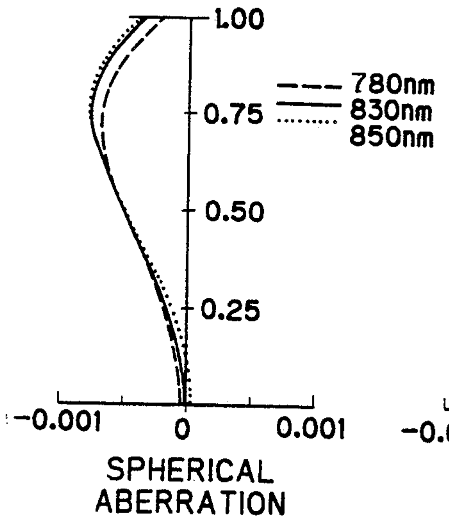
Figure 4B:
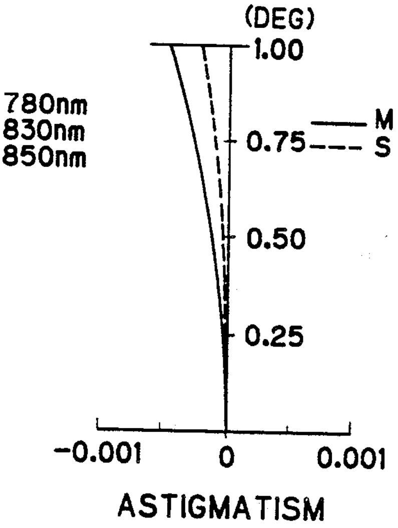
Figure 4C:
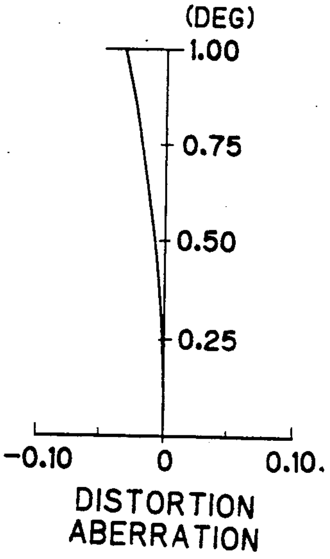
Figure 5A:
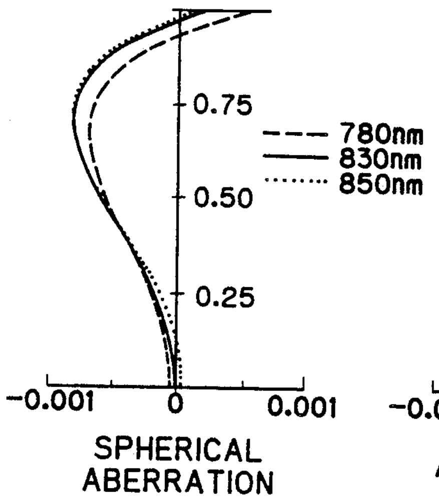
Figure 5B:
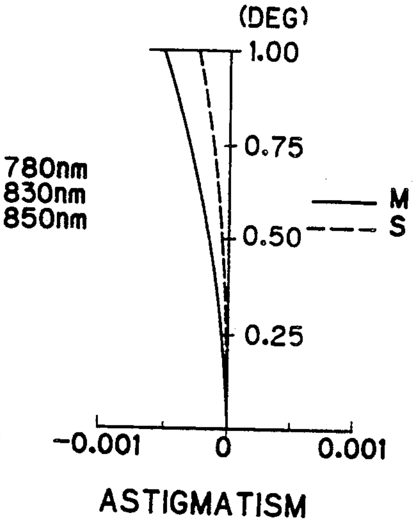
Figure 5C:
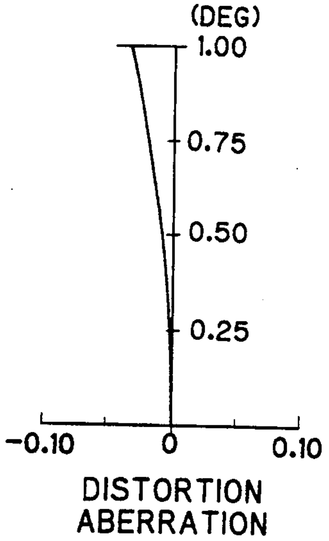
Figure 6A:
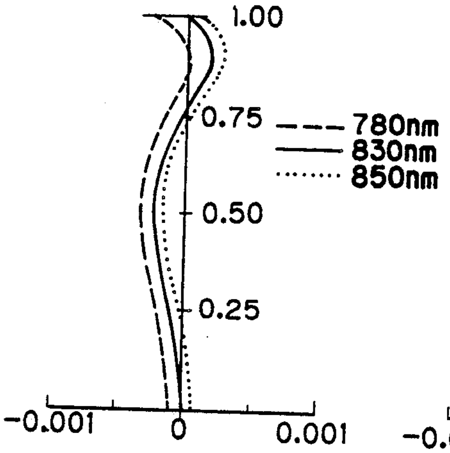
Figure 6B:
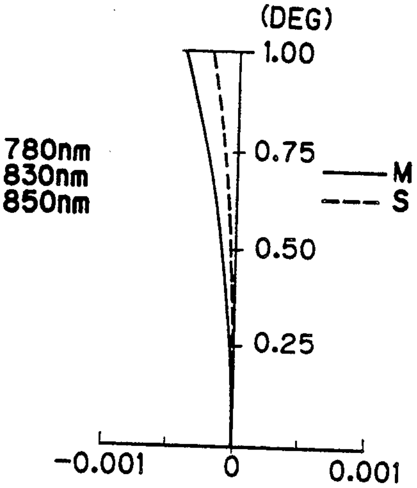
Figure 6C:
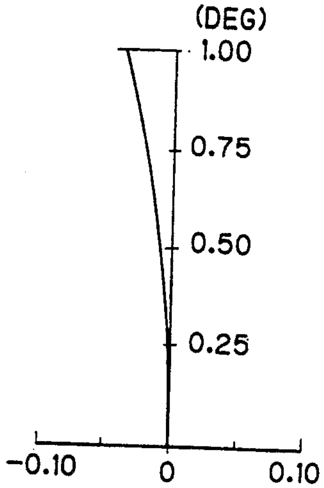
Figure 7A:
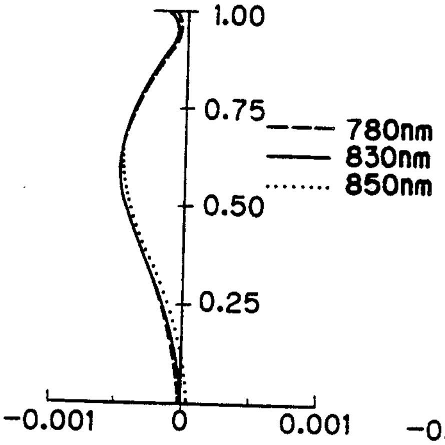
Figure 7B:
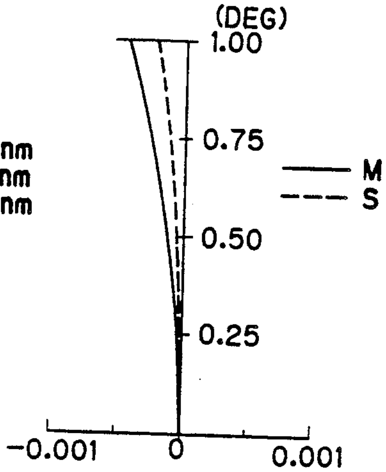
Figure 7C:
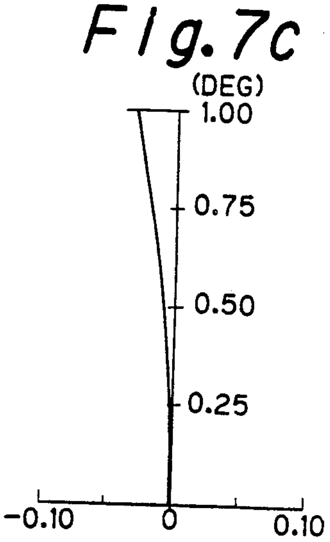

In the objective lens for an optical disk in the present invention, as shown in FIG. 1, first and second lens groups are sequentially arranged from the side of a light source (on the left-hand side in FIG. 1) toward the side of the optical disk (on the right-hand side in FIG. 1).

The first lens group is constructed by joining a negative meniscus lens 10, a biconvex lens 12, and a negative meniscus lens 14 sequentially arranged from the side of the light source. The second lens group is constructed by a positive meniscus lens 20. Accordingly, the first and second lens groups are constructed by the above four lenses as a whole.

A combined focal distance f of the entire lens system, a focal distance $f_1$ of the first lens group, a radius $r_i$ ($i=1$ to 6) of curvature of an i-th lens face from the side of the light source, and a refractive index $n_j$ and an Abbe number $\nu_j$ ($j=1$ to 4) of a j-th lens from the side of the light source satisfy the following conditions.

(I) $0.7<f^2/|r_2 \cdot r_3|<2.0$, $r_2>0$, $r_3<0$ (II) $2.0<[(n_1-1)+(n_3-1)]/(n_2-1)<3.0$ (III) $15<[(\nu_2-\nu_1)+(\nu_2-\nu_3)]<90$ and (IV) $2.0<(f_1/f)<6.0$.

In FIG. 1, a recording face of an optical disk 30 is formed on the right-hand side thereof.

The above conditions (I) to (IV) will next be explained.

The condition (I) is a condition for excessively correcting chromatic and spherical aberrations by a balance of radii $r_2$ and $r_3$ of curvature of joining faces of the first lens group and canceling chromatic and spherical aberrations caused by the positive meniscus lens 20 of the second lens group.

When the value $f^2/|r_2r_3|$ in the condition (I) exceeds an upper limit thereof, the spherical aberrations with respect to the first and second lens groups are unbalanced, thereby increasing remaining spherical aberration. When the above value in the condition (I) exceeds a lower limit thereof, it is difficult to cause positive chromatic aberration in the first lens group which is sufficient to correct negative chromatic aberration caused in the second lens group.

The condition (II) is a condition for preferably setting the chromatic and spherical aberrations by a balance of refractive index with respect to three lenses constituting the first lens group.

When the value $[(n_1-1)+(3-1)]/(n_2-1)$ in the condition (II) exceeds an upper limit thereof, the chromatic aberration is insufficiently corrected. When this value in the condition (II) exceeds a lower limit thereof, the spherical aberration is insufficiently corrected.

The condition (III) is a condition for preferably correcting the chromatic aberration by a balance of Abbe number with respect to the three lenses constituting the first lens group.

When the value $[\nu_2-\nu_1)+(\nu_2-\nu_3)]$ in the condition (III) exceeds an upper limit thereof, the chromatic aberration is excessively corrected. When this value in the condition (III) exceeds a lower limit thereof, the chromatic aberration is insufficiently corrected.

The condition (IV) is a condition for securing a sufficiently long working distance by providing a suitable allocation for the focal distance of the first lens group with respect to a combined focal distance of the entire lens system.

When the value $(f_1/f)$ in the condition (IV) exceeds an upper limit thereof, spherical and comatic aberrations are increased. When this value in the condition (IV) exceeds a lower limit thereof, the working distance is reduced so that there is a fear that the lens system comes in contact with the optical disk.

The concrete Embodiments 1 to 6 of the present invention will next be described.

As shown in FIG. 1, in the respective embodiments, reference numeral $r_i$ (i=1 to 6) designates a radius of curvature of an i-th lens face from the side of the light source. Reference numeral $d_i$ (i=1 to 5) designates a distance between the i-th lens faces from the side of the light source. Reference numerals $n_j$ and $\nu_j$ (j=1 to 4) respectively designate a refractive index (with respect to wavelength 830 nm) of a j-th lens from the side of the light source and an Abbe number with respect to d line. Further, reference numeral W.D designates a distance from a final lens face, i.e., a sixth lens face to the optical disk. A designing condition of the optical disk is as follows.

disk thickness $d_c=0.2667$ refractive index $n_c=1.57035$ (with respect to wavelength 830 nm)

Abbe number $\nu_c=30.8$ (which is a value with respect to d line)

Further, the light source is assumed to be located at infinity.

Further, reference numerals $k_1$, $k_2$, $k_3$ and $k_4$ designate values of conditional parameters in the conditions (I) to (IV).

Embodiment 1
f = 1.0, N.A = 0.50, W.D = 0.4937

| i | $r_i$ | $d_i$ | j | $n_j$ | $\nu_j$ |
|---|---|---|---|---|---|
| 1 | 2.0200 | 0.1778 | 1 | 1.82156 | 23.78 |
| 2 | 0.7991 | 0.5556 | 2 | 1.61214 | 60.35 |
| 3 | −1.0060 | 0.6222 | 3 | 1.82156 | 23.78 |
| 4 | −2.2316 | 0.0222 | | | |
| 5 | 0.6971 | 0.3456 | 4 | 1.68880 | 40.18 |
| 6 | 2.2327 | | | | |

$k_1 = 1.244$, $k_2 = 2.68$, $k_3 = 73.14$, $k_4 = 2.37$

Embodiment 2
f = 1.0, N.A = 0.50, W.D = 0.2173

| i | $r_i$ | $d_i$ | j | $n_j$ | $\nu_j$ |
|---|---|---|---|---|---|
| 1 | 1.6542 | 0.1111 | 1 | 1.78829 | 33.27 |
| 2 | 0.8596 | 0.4444 | 2 | 1.66826 | 55.52 |
| 3 | −1.3053 | 0.4889 | 3 | 1.82156 | 23.78 |
| 4 | −8.7231 | 0.4444 | | | |
| 5 | 0.6109 | 0.4380 | 4 | 1.76028 | 49.65 |
| 6 | 1.8889 | | | | |

$k_1 = 0.891$, $k_2 = 2.41$, $k_3 = 53.99$, $k_4 = 3.16$

Embodiment 3
f = 1.0, N.A = 0.50, W.D = 0.3802

| i | $r_i$ | $d_i$ | j | $n_j$ | $\nu_j$ |
|---|---|---|---|---|---|
| 1 | 2.0347 | 0.1111 | 1 | 1.78267 | 25.46 |
| 2 | 0.7756 | 0.4444 | 2 | 1.70745 | 43.90 |
| 3 | −1.0282 | 0.4000 | 3 | 1.78267 | 25.46 |
| 4 | −5.9802 | 0.1000 | | | |
| 5 | 0.6180 | 0.3563 | 4 | 1.70882 | 50.34 |
| 6 | 1.4365 | | | | |

$k_1 = 1.254$, $k_2 = 2.21$, $k_3 = 36.88$, $k_4 = 2.981$

Embodiment 4
f = 1.0, N.A = 0.50, W.D = 0.3706

| i | $r_i$ | $d_i$ | j | $n_j$ | $\nu_j$ |
|---|---|---|---|---|---|
| 1 | 2.1520 | 0.1778 | 1 | 1.82156 | 23.78 |
| 2 | 0.6827 | 0.5111 | 2 | 1.79069 | 35.54 |
| 3 | −0.8138 | 0.4178 | 3 | 1.82156 | 23.78 |
| 4 | −30.6273 | 0.0222 | | | |
| 5 | 0.6073 | 0.3313 | 4 | 1.76028 | 49.65 |
| 6 | 1.3069 | | | | |

$k_1 = 1.800$, $k_2 = 2.08$, $k_3 = 23.52$, $k_4 = 3.05$

Embodiment 5
f = 1.0, N.A = 0.50, W.D = 0.4930

| i | $r_i$ | $d_i$ | j | $n_j$ | $\nu_j$ |
|---|---|---|---|---|---|
| 1 | 2.6893 | 0.4922 | 1 | 1.82156 | 23.78 |
| 2 | 0.7127 | 0.3340 | 2 | 1.57965 | 48.56 |
| 3 | −0.9513 | 0.4838 | 3 | 1.82156 | 23.78 |
| 4 | −1.8991 | 0.0222 | | | |
| 5 | 0.7871 | 0.4889 | 4 | 1.76028 | 49.65 |
| 6 | 3.8776 | | | | |

$k_1 = 1.475$, $k_2 = 2.84$, $k_3 = 49.56$, $k_4 = 5.39$

Embodiment 6
f = 1.0, N.A = 0.50, W.D = 0.6210

| i | $r_i$ | $d_i$ | j | $n_j$ | $\nu_j$ |
|---|---|---|---|---|---|
| 1 | 2.8311 | 0.1111 | 1 | 1.78829 | 33.27 |
| 2 | 0.7696 | 0.4444 | 2 | 1.66826 | 55.52 |
| 3 | −0.8711 | 0.4889 | 3 | 1.82156 | 23.78 |
| 4 | −2.6813 | 0.0222 | | | |
| 5 | 0.7631 | 0.2378 | 4 | 1.76028 | 49.65 |
| 6 | 2.9556 | | | | |

$k_1 = 1.492$, $k_2 = 2.41$, $k_3 = 53.99$, $k_4 = 3.96$

FIGS. 2 to 7 are aberration diagrams corresponding to the above Embodiments 1 to 6. In the respective embodiments, chromatic aberration is sufficiently considered so that the objective lens can sufficiently correspond to a rapid change in wavelength.

As mentioned above, in accordance with the above-mentioned objective lens for an optical disk in the present invention, it is possible to obtain a preferable light spot having a reduced size about 1 μm. Accordingly, no light spot is defocused when a rapid change in wavelength is caused in the light source. Therefore, it is possible to record, erase and reproduce information at a high speed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An objective lens for an optical disk comprising:

a first lens group constructed by joining a negative meniscus lens, a biconvex lens, and a negative meniscus lens sequentially arranged from the side of a light source; and a second lens group constructed by a positive meniscus lens;

said first and second lens groups being sequentially arranged from the side of the light source toward the side of the optical disk;

a combined focal distance f of the entire lens system, a focal distance $f_1$ of the first lens group, a radius $r_i$ ($i=1$ to 6) of curvature of an i-th lens face from the side of the light source, and a refractive index $n_j$ and an Abbe number $\nu_j$ ($j=1$ to 4) of a j-th lens from the side of the light source satisfying the following conditions, (I) $0.7<f^2/|r_2 \cdot r_3<2.0$, $r_2>0$, $r_3<0$ (II) $2.0<[(n_1-1)+(n_3-1)]/(n_2-1)<3.0$ (III) $15<[(\nu_2-\nu_1)+(\nu_2-\nu_3)]<90$ and (IV) $2.0<(f_1/f)<6.0$.

2. An objective lens as claimed in claim 1, wherein the condition (I) is a condition for excessively correcting chromatic and spherical aberrations by a balance of radii of curvature of joining faces of the first lens group and canceling chromatic and spherical aberrations caused by the positive meniscus lens of the second lens group.

3. An objective lens as claimed in claim 1, wherein the condition (II) is a condition for preferably setting the chromatic and spherical aberrations by a balance of refractive index with respect to three lenses constituting the first lens group.

4. An objective lens as claimed in claim 1, wherein the condition (III) is a condition for preferably correcting the chromatic aberration by a balance of Abbe number with respect to the three lenses constituting the first lens group.

5. An objective lens as claimed in claim 1, wherein the condition (IV) is a condition for securing a sufficiently long working distance by providing a suitable allocation for the focal distance of the first lens group with respect to a combined focal distance of the entire lens system.

* * * * *

UNITED STATES PATENT AND TRADEMARK OFFICE
CERTIFICATE OF CORRECTION

PATENT NO. : 4,995,710

DATED : FEBRUARY 26, 1991

INVENTOR(S) : SEIZOH SUZUKI ET AL.

It is certified that error appears in the above-identified patent and that said Letters Patent is hereby corrected as shown below:

COLUMN 5

Claim 1, line 18, please change "$|r_2 \cdot r_3$" to --$|r_2 \cdot r_3|$--.

Signed and Sealed this

Twentieth Day of October, 1992

Attest:

DOUGLAS B. COMER

*Attesting Officer*

*Acting Commissioner of Patents and Trademarks*